United States Patent [19]

Redlich et al.

[11] 3,796,825

[45] Mar. 12, 1974

[54] RECORDING CARRIER FOR VIDEO SIGNALS WITH SPIRAL OR HELICAL TRACK AND AN ODD NUMBER OF FIELDS PER TURN

[75] Inventors: Horst Redlich; Gerhard Dickopp; Franz-Eberhard Krause, all of Berlin, Germany

[73] Assignee: Ted Bildplatten Aktiengesellschaft, Zug, Switzerland

[22] Filed: Oct. 25, 1972

[21] Appl. No.: 300,489

[30] Foreign Application Priority Data

Oct. 29, 1971 Germany.......................... 2153917

[52] U.S. Cl.......................... 178/6.6 DD, 178/6.6 A

[51] Int. Cl............................................. H04n 5/76

[58] Field of Search........ 178/6.6 A, 6.6 DD, 6.7 R, 178/6.7 A, 5.4 CD; 179/100.3 V, 100.4 C

[56] References Cited

UNITED STATES PATENTS 3,423,524 1/1969 Bradford..................... 179/100.3 V 3,683,992 8/1972 Farr............................. 178/5.4 CD

*Primary Examiner*—Raymond F. Cardillo, Jr.

*Attorney, Agent, or Firm*—Spencer & Kaye

[57] ABSTRACT

On a recording carrier on which video information is recorded along a spiral recording track, each frame of the recorded picture is recorded as an odd number plurality of fields, each turn of the recording track consists of such odd number of fields, and each field is constituted by a whole number of picture lines plus a portion of a picture line whose relation to a whole picture line is represented by a proper fraction whose numerator is an integer and whose denominator is equal to the number of lines recorded per field, so that the horizontal sync pulses on adjacent track turns lie on common lines normal to the direction of scanning of the carrier.

4 Claims, 9 Drawing Figures

RECORDING CARRIER FOR VIDEO SIGNALS WITH SPIRAL OR HELICAL TRACK AND AN ODD NUMBER OF FIELDS PER TURN

BACKGROUND OF THE INVENTION

The present invention relates to a recording carrier for video signals to be applied to a standard television receiver for recreating the recorded program, the carrier being provided with a recording along a spiral or helical recording track each turn of which contains a plurality of complete picture line signals which can be played back during one vertical deflection, or scanning, period of the television receiver.

In the production of recordings of this type, a carrier oscillation is usually used to record the video signals. It is known, in this connection, to effect the recording in such a manner that, for example, with a disc-shaped recording carrier, similar picture information is recorded in adjacent sections, i.e., at the same angular location, of adjacent turns of the track.

A picture record is known, for example, on which a television recording is recorded with 50 fields, or half-frames, per second and which can be played back at 1,500 revolutions per minute. This means that two fields, or half-frames of the video signal are recorded per turn in the spiral-shaped recording track.

This type of recording has the advantage that all recorded horizontal sync pulses for the video signal lie on the same radii of the picture record. This in turn makes it possible, during playback, to have the pickup pass from one turn to an adjacent turn without this causing interference in the picture or line changes on the screen of the television receiver used to reproduce the played back video signal.

It is also known to increase the storage capacity of a picture record by enlarging its diameter, for example from 21 cm to 30 cm, while simultaneously reducing the number of revolutions during playback from 1,500 rpm to 750 rpm. Such a possibility is disclosed in the German publication VDI Nachrichten (News), of July 1st, 1970, page 1. In this case, four half-frames of a video signal would be recorded in each turn of the recording track on the picture record. Corresponding horizontal sync pulses of the video signal for each fourth half-frame would then again be recorded on the same radius of the picture record.

Television broadcasts employ the so-called line interlace method in which, during playback of a television picture on a screen, only a partial image, i.e., a field, with relatively large spacings between the picture lines is reproduced during one vertical sweep and thereafter a second field with the same number of lines is reproduced, the lines of the second field being traced between successive lines of the first field. A complete picture reproduced on the screen thus consists of two fields which are interlaced in a comb-like manner.

Interlacing is achieved in the following manner. The vertical deflection of the electron beam which traces the image on the screen of the picture tube always occurs between an upper and a lower limit which are spatially constant for all fields. The image lines are traced by the electron beam at a slight angle to the horizontal so that the end of each image line is about two image line intervals lower than the beginning of that image line. Moreover, each field contains, in addition to a whole number of image lines, an additional half image line. A video signal meeting these requirements and having line sync pulses between successive image lines of each field and vertical sync pulses between successive fields is processed by a television receiver standardized for television broadcast reception so that the desired interlacing of two fields is effected to form each whole frame on the screen.

In the determination of the recording parameters for a rotating recording carrier for video signals it is advisable to take care that the picture reproduction derived from the video signals picked up from the recording carrier can be effected by television receivers designed to receive standard television broadcasts. The recorded video signals must thus be as close to this standard as possible.

Care must also be taken to assure that the recording carrier surface available for the recording is optimally utilized. With disc-shaped recording carriers this occurs when the radius of the outermost turn of the recording track is twice the radius of the innermost turn.

Finally, care must be taken that the recording carrier has dimensions which still permit easy handling of the recording carrier itself as well as of the playback device whose size must be adapted to the dimensions of the recording carrier. Moreover, the playback speed of the recording carrier during playback must be high enough to permit the reproduction of high frequencies. The playback speed, however, must also not be too high, because this would have an adverse effect, inter alia, on the wear of the pickup.

The consideration of all these prerequisites leads to the desire to record, not exactly two or four half-frames per turn of the recording track on the recording carrier, but rather to select the recording parameters independently of the limitation that only two or four half-frames can be stored along one turn of the recording carrier.

SUMMARY OF THE INVENTION

It is therefore an object of the invention to provide an improved manner of recording video signals along a spiral track while continuing to maintain horizontal sync pulses of fields recorded next to each other in adjacent turns on common radii of the rotating recording carrier.

The present invention is surprising, particularly when, on first consideration, it seems to be impossible to reconcile these requirements. This appears so because if only three fields of a video signal according to the Gerber standard are recorded, for example, in one turn of the recording track, where each field has 312 ½ lines (262 ½ lines in the NTSC Standard), it inevitably results that the line sync pulses recorded in one turn of the recording track will not lie on the same radii as the line sync pulses in the adjacent turn of the recording track, but rather exactly midway between two consecutive line sync pulses on the adjacent turn.

The present invention nevertheless does solve this problem by recording the video information on the above-described recording carrier so that the recording contains an odd number plurality of complete fields per turn, and the recorded video signals deviate from the usual standard video signals employed in television broadcasts, particularly with respect to the sync pulses, such that each field contains, in addition to a whole number of picture lines, that portion of one picture line which is represented by a proper fraction whose numerator is a whole number and whose denominator is the above-mentioned odd number of fields per turn.

If, for example three fields are to be recorded on one turn of the recording track, each field may contain, according to the present invention, 312 ⅓ picture lines or it could even be, for example, also 305 ⅔ picture lines. The sum of all picture lines recorded in one track turn under these circumstances will always be a whole number. It would also be possible, according to the present invention, to record five fields in one turn of the recording track, each field then containing $n+1/5$ or $n+2/5$ or $n+3/5$ or $n+4/5$ picture lines $n$ being a whole number of the order of magnitude of 312. For other television standards $n$ represents a different number.

During playback on a standard television receiver of video information from a recording carrier which has been recorded according to the present invention, a picture results on the screen which, if three fields were recorded in one turn of the recording track for example, is composed of a series of frames each consisting of three comb-like interlaced fields. Each one of these fields is traced on the screen, according to the Gerber standard, by the electron beam of the picture tube during one vertical deflection period having a duration of 1/50 second. Thus it takes 3/50 second for a complete frame consisting of three fields to be completely traced.

The television picture information signal produced by the television camera and used for recording of the video signal on the recording carrier, must be adapted to this pattern.

It is known that in the line interlace method employing half-frames there is present a line flicker at a frequency of 25 Hz, in the Gerber standard, although the vertical deflection frequency of the electron beam in the picture tube is 50 Hz. When three fields are recorded in one turn of the recording track of a recording carrier according to the present invention, line flicker will occur at a frequency of 16 ⅔ Hz. This undesirable side effect of a relatively low frequency line flicker is counteracted by the advantage that the use of the present invention permits the number of lines of the complete picture reproduced on the screen to be increased by 50 percent compared to the number of lines in the television braodcast when the present invention is being employed.

When five fields are recorded within one turn of the recording track of the recording carrier of the present invention and these five fields reproduced to form one picture frame, the line flicker should actually be of an even lower frequency, i.e., only 10 Hz. This can be prevented, however, by causing the fraction of a picture line contained in each recorded field, to differ only slightly from one-half. For example, the number of lines selected for each field will not be 312 1/5 or 312 4/5, but rather 312 2/5 or 312 3/5, because the proper fractions 2/5, or 3/5, respectively, are closer to ½ than 1/5 and 4/5. Under these circumstances, instead of the line flicker frequency of 10 Hz to be expected under the German television standard, there will be a line flicker frequency of 20 Hz. In the North American television standard, which operates with a half-frame frequency of 60 Hz, the resulting line flicker frequency would be 24 Hz.

DESCRIPTION OF THE PREFERRED EMBODIMENTS

Figure 1:
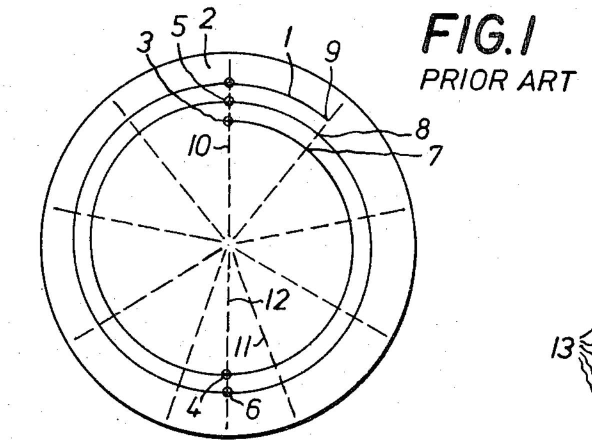
FIG. 1 PRIOR ART
FIG. 1 is a simplified pictorial view of a known disc-shaped recording carrier, two turns of the recording track being shown.
Figure 3:
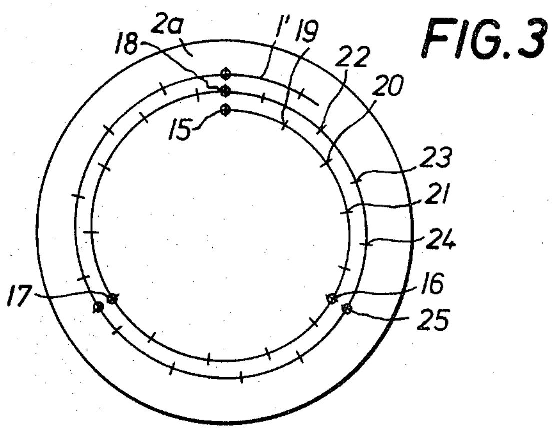
FIG. 3 is a view similar to that of FIG. 1 of a recording carrier on which each turn of the recording track is provided with three fields, without applying the principles of the present invention.
Figure 4:
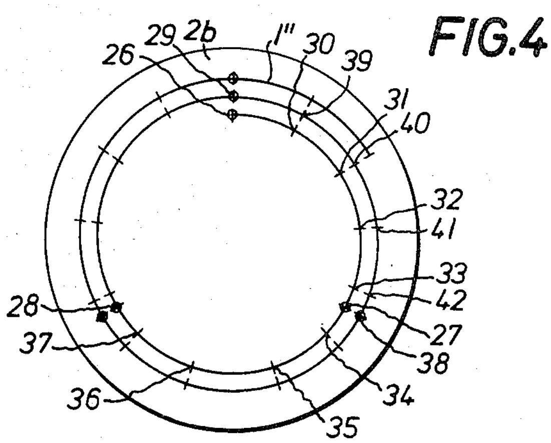
FIG. 4 is a view similar to that of FIG. 1 of a recording carrier produced according to the present invention.

The present invention will be explained in detail with the aid of the drawings. FIGS. 1, 3 and 4 are basic representations of disc-shaped recording carriers, although the invention can also be applied to cylindrical or spherical recording carriers. In order to simplify the illustration, the convention has been adopted that each one of the fields recorded on the recording carrier contains only four complete picture lines plus a fraction of one picture line.

Only two turns of the recording track 1 on recording carrier 2 are shown in FIG. 1. Between points 3 and 4 a half turn of the recording track 1 contains the recording of a standard half-frame in the recording track. The following half-frame, assuming outward radial movement of the pickup, lies between points 4 and 5. As can be seen, the line sync pulses 7, 8, 9 for the same point of successive frames are placed, in a known manner, on a common radius of the recording carrier.

Figure 2:
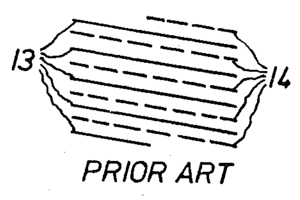
FIG. 2 PRIOR ART
FIG. 2 is a schematic representation of the picture dot lines which an electron beam would trace on the screen of a standard television receiver if the receiver were used to reproduce a picture from the video signal stored on the recording carrier according to FIG. 1.

FIG. 2 shows the picture dot lines resulting on the screen of a television receiver during scanning of the recording carrier 2. In the half turn between points 3 and 4 of the record track of carrier 2 of FIG. 1, four picture lines are recorded between radii 10 and 11 and one-half of a picture line is recorded between radii 11 and 12. The four and one-half picture dot lines 13 of FIG. 2 correspond to this recording. Between points 4 and 5 in FIG. 1, a further half-frame composed of four and one-half lines is recorded in recording track 1. This half-frame corresponds to the four and one-half picture dot lines 14 in FIG. 2.

The two half-frames represented by the picture dot lines 13 and 14, respectively, mesh with one another due to the line interlace scanning produced in the television receiver. For the recording between points 5 and 6 in FIG. 1 there again result picture dot lines 13. If the pickup for playing back the recording from the recording carrier 2 should jump, for example, from the portion of the recording track 1 disposed between points 3 and 4 to the portion disposed between points 5 and 6, there will be no interference in the line synchronization or in the vertical synchronization in the television receiver.

In the recording carrier 2a shown in FIG. 3 three fields are recorded in each turn of the recording track 1′. One field is recorded, for example, between points, 15 and 16, the next field is disposed between points 16 and 17 and the third field between points 17 and 18. Each frame contains - as indicated by the line sync pulses 19, 20, 21, etc. - four and one-half picture lines.

As shown in FIG. 3, the line sync pulses 22, 23, 24 associated with the field recorded between points 18 and 25 do not lie on the same radii of the recording carrier 2*a* as the line sync pulses 19, 20, 21 of the adjacent turn of the recording track 1′. It thus initially seems that it would not be possible to accommodate an odd number of fields in one turn of the recording track 1′ in such a manner that, on the one hand, the line sync pulses of adjacent turns of the recording track lie on common radii of the disc-shaped recording carrier and, on the other hand, it is assured that the recording can be played back with a standard television receiver.

FIG. 4 shows an embodiment of a recording carrier according to the present invention which again exhibits the advantages of the recording carrier shown in FIG. 1 but does not have the drawbacks of the recording carrier of FIG. 3, In the illustrated example, three fields are recorded in each turn of the recording track 1″ of the recording carrier 2b.

The recording of one field is disposed between points 26, 27, 28 and 29. The field recorded between points 26 and 27 is divided into 4⅓ picture lines by the line sync pulses 30, 31, 32 and 33. The field between points 27 and 28 is divided into three full picture lines and two two-thirds picture lines by line sync pulses 34, 35, 36 and 37, i.e., this field also contains a total of 4 ⅓ picture lines. The field between points 28 and 29 is divided in the same manner as the field between points 26 and 27, however in the reverse sequence of ⅓ picture line and four complete picture lines.

The decisive factor is now that in the following track turn, for example between points 29 and 38 the line sync pulses 39, 40, 41 and 42 lie immediately adjacent to i.e., on the same radii as, the line sync pulses 30, 31, 32 and 33, respectively, of the preceding turn. If the pickup used to play back the recording on the recording carrier 2b jumps from one turn of recording track 1″ to another, no interference or disturbance will occur in the line or vertical synchronization.

Figure 5:
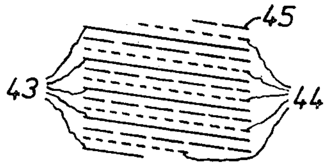
FIG. 5 is a schematic representation of the picture dot lines of an electron beam on the screen of a standard television receiver when the latter is used to reproduce the video signal recorded on the recording carrier according to FIG. 4.

FIG. 5 shows the pattern of picture dot lines on the screen of a standard television receiver receiving the signal played back from the carrier of FIG. 4. The picture dot lines 43 shown in solid lines correspond to the recording between points 26 and 27 in FIG. 4. After the one-third picture line recorded between line sync pulses 33 and point 27 has been traced on the screen, a new picture commences with the cathode ray beam being deflected back to the top of the screen face, so that the remaining two-thirds of the picture line which are recorded between point 27 and line sync pulse 34, are traced beginning at the upper edge of the screen. These two-thirds of the picture line, as well as all other picture lines recorded between points 27 and 28 are shown in FIG. 5 as dotted picture dot lines 44.

The third field recorded on the carrier of FIG. 4 between points 28 and 29 in the turn of recording track 1″ which begins at point 26 produces, during playback, the picture dot lines 45 shown by dashed lines in FIG. 5.

In FIG. 5 there are not two half-frames which are interlaced, as in FIG. 2, but rather three third-frames. The same time is required to play back each third-frame on the screen of the television receiver as to play back a half-frame according to FIG. 2, i.e., in the German television standard this time is 1/50 second. While the complete picture according to FIG. 2, which consists of two half-frames, is traced in the course of 2/50 second, the electron beam requires 3/50 second to trace the complete picture according to FIG. 5, which consists of three third-frames. However, one field is still always traced during 1/50 second.

When recording, for example, five fields in one turn of a recording track, it is advantageous to have the lowermost picture dot line, which in FIG. 5 corresponds to the last picture dot line 43, end as close as possible to the vicinity of the center of the lower screen edge so that the following picture dot lines will come to lie as close as possible to midway between the lines of the immediately preceding field. This means that the proper fraction which represents the portion of a picture line which is to be part of a field in addition to a whole number of picture lines, should differ only slightly from ½. In particular it should be as close to ½ as the denominator of the fraction permits.

It has thus far not been mentioned, but is a matter of course in the practice of the present invention, that the recording carrier according to the present invention is played back at a constant rate of rotation.

It is one advantage of the invention, that for picture reproduction derived from the video signals picked up from the recording carrier a television receiver designed to receive standard television broadcasts can be used without modifications.

Only the form of the field-sync pulses (vertical sync pulses), the relations between the horizontal and field sync pulses on the carrier and the sweep frequency of the equalizing pulses in each sequence of such pulses must be modified insignificantly.

FIGS. 6 to 9 are diagrams with details of field-synchronizing waveforms applicable for a carrier with 3 fields recorded in each turn of the track according to one example according to the invention.

Figures 6, 7, 8, 9:
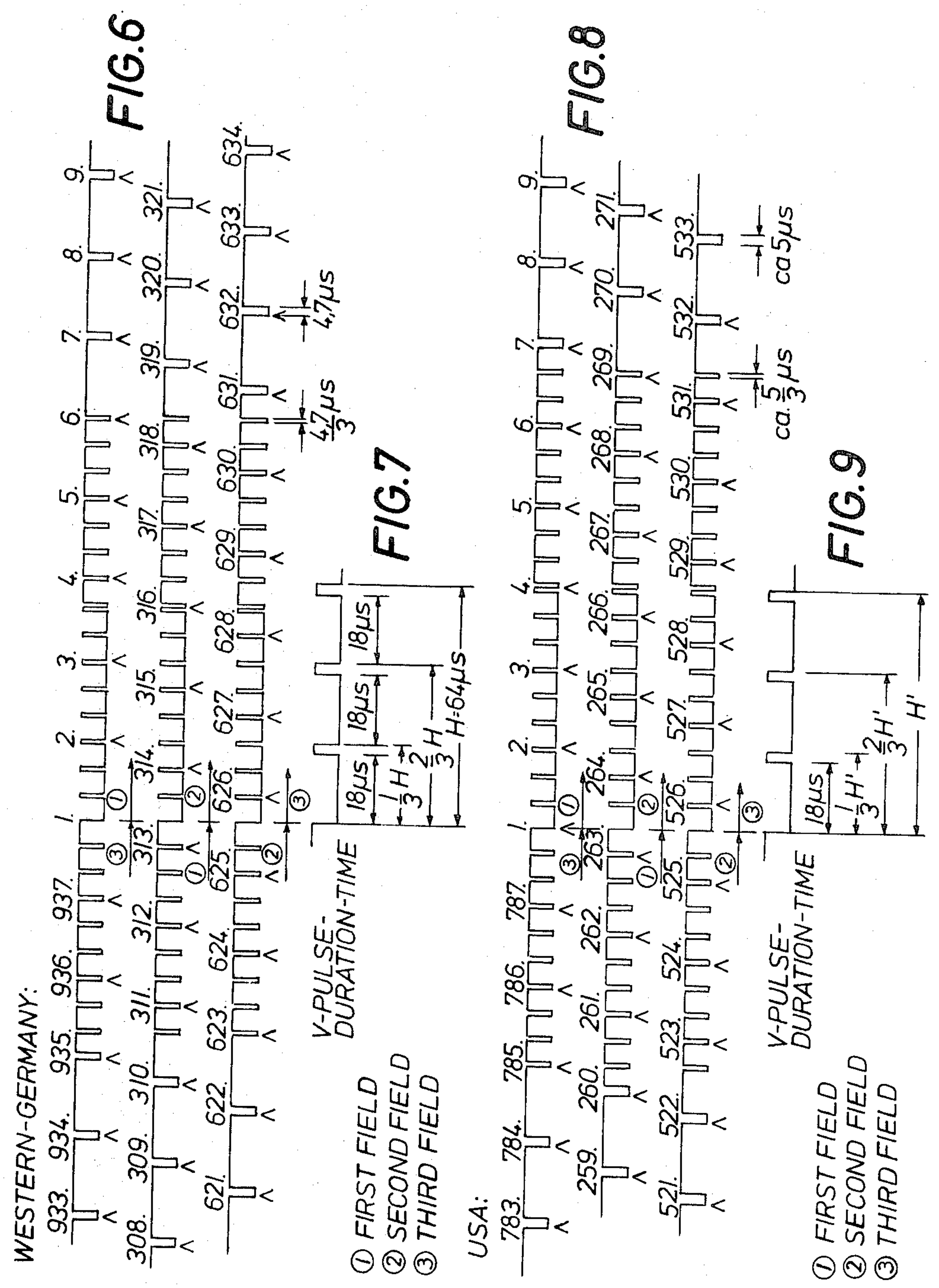
FIG. 6 is a voltage vs. time waveform diagram of the synchronizing pulses recorded according to the present invention for a television signal according to the West German Gerber standard.
FIG. 7 is a diagram to an enlarged time scale of the pulses in line 1 of the diagram of FIG. 6.
FIG. 8 is a diagram similar to that of FIG. 6 for a television signal according to the U.S. NTSC standard.
FIG. 9 is a view similar to that of FIG. 7 relating to the diagram of FIG. 8.

FIGS. 6 and 7 are adapted to the standard, used in Western Germany (Gerber standard). The sync pulses, shown in FIG. 6 are some of those of 3 succeeding fields, which shown pulses are recorded close to the field-synchronizing pulses in one turn of the track. Below each one of the numbers 936, 937, 1, 2 .... there is beginning a new line of the field (marked by points of arrows). The first line of field ① has its duration from number 1 to number 2. Each field ①, ②, ③ begins with a field-synchronizing pulse having a duration of about 2 ½ lines followed by a sequence of equalizing pulses, which sequence has a duration of about another 2 ½ lines. Before each field-sync pulse there is also a sequence of equalizing pulses having a duration of about 2 ½ lines. Field ① has 312 ⅓ lines (line 312 has its close at number 313!).

For standard receivers it is essential that the series of the line-sync pulses is continued during the sequence of the equalizing pulses and during the duration of the field-sync pulses. On the other hand all sequences of the field-sync pulses are to be made equal. Since the beginnings of the fields ① and ③ are situated between two line-sync pulses it is necessary to provide additional pulses during the duration of the field-sync pulses. The frequency of the equalizing pulses is equal to the frequency of these additional pulses and is corresponding to the treble frequency of the line-sync pulses.

Since every field has 312 ⅓ lines, the 3 fields of one turn of the track together have 937 lines, so that after each sequence of 3 fields, as shown in FIG. 6, a new sequence of equal form may begin.

FIG. 7 is a diagram, showing in a larger scale the pulses of line 1 with its durations. The total length H of one line is 64 μs. Since one field no longer has 312 ½, but 312 ⅓ lines, the duration of one field is about 10.7 μs shorter. Therefore the field frequency is no longer 50 Hz but 50.0267 Hz. If the field frequency shall remain 50 Hz the duration of each line may be shortened by about 0.053 percent, so that the line frequency becomes a little higher than the standard line frequency of 15,625 Hz. But these changes in field or line frequency don't influence the mode of operation of a standard television receiver.

FIGS. 8 and 9 are adapted to the standard, used in the USA. Here each field-synchronizing pulse has a duration of 3 lines, followed by equalizing pulses having too a duration of about 3 lines. Before each field-sync pulse there is also a sequence of equalizing pulses of the same duration. Field 1 has 262 ⅓ lines. A sequence of 3 fields has 787 lines.

FIG. 9 is a diagram, showing in a larger scale the pulses of line 1 with its durations. The total length H' of one line is about 63.5 μs. In this case the duration of one field with 262 ⅓ lines is shorter by 1/6 of one line than in the standard case of 262 ½ lines. Thus the field frequency is 60.038 Hz instead of 60 Hz. If the field frequency shall remain 60 Hz the duration of each line is to shorten, so that the line frequency becomes about 0.064 percent higher than the standard line frequency of 15,750 Hz.

If the line frequency of 60 Hz (50 Hz for FIG. 6) is kept, it is possible to drive the carrier with a synchronous motor. On the other hand, if the duration of one line in FIG. 6 (H = 64 μs) is kept, it is possible to use standard delay lines in a play back device, which delay lines usual are provided in German colour television receivers. These delay lines in the play back device are necessary if colour signals are stored on the carrier as sequences of three lines, each containing only signals for one colour. The delay lines than serve for transforming these stored signals into standard colour signals.

It will be understood that the above description of the present invention is susceptible to various modifications, changes and adaptations, and the same are intended to be comprehended within the meaning and range of equivalents of the appended claims.

We claim:

1. In a recording carrier for video signals which can be played back into a standard television receiver and which carries a recording extending along a spiral or helical recording track each turn of which contains the recording of a whole number plurality of fields of a video signal, with each field being played back during one vertical deflection period of the television receiver, the improvement wherein said recording contains an odd number of fields per turn, and each said field contains a whole number of picture lines plus that portion of one picture line whose relation to a whole picture line is represented by a proper fraction whose numerator is an integer and whose denominator is equal to said odd number of fields per turn.

2. Recording carrier as defined in claim 1 wherein the odd number is 3.

3. Recording carrier as defined in claim 1 wherein the proper fraction differs only slightly from one-half.

4. Recording carrier as defined in claim 3 wherein the value of the proper fraction is the closest to one-half which is possible in regard to the number constituting the denominator.

* * * * *

UNITED STATES PATENT OFFICE
CERTIFICATE OF CORRECTION

Patent No. 3,796,825 Dated March 12th, 1974

Inventor(s) Horst Redlich, Gerhard Dickopp and Franz-Eberhard Krause

It is certified that error appears in the above-identified patent and that said Letters Patent are hereby corrected as shown below:

In the heading of the patent, line 8, change "Ted Bildplatten Aktiengesellschaft" to --TED Bildplatten Aktiengesellschaft, AEG-Telefunken · Teldec--. Column 3, line 12, insert a comma --,-- after "lines". Column 5, line 10, delete the comma "," after "points". Column 7, line 6, change " ① " to -- ② --.

Signed and sealed this 17th day of September 1974.

(SEAL)
Attest:

McCOY M. GIBSON JR.
Attesting Officer

C. MARSHALL DANN
Commissioner of Patents